Melvin C. Chamberlin's Tire Regulator

No. 118,587.

[22.]

Patented Aug. 29, 1871.

Witnesses:
C. L. Evert
Jas. E. Hutchinson

Inventor:
M. C. Chamberlin
per
Xander V. Melton
Attys.

UNITED STATES PATENT OFFICE.

MELVIN C. CHAMBERLIN, OF WABASHA, MINNESOTA.

IMPROVEMENT IN TIRE-TIGHTENERS.

Specification forming part of Letters Patent No. 118,587, dated August 29, 1871.

*To all whom it may concern:*

Be it known that I, MELVIN C. CHAMBERLIN, of Wabasha, in the county of Wabasha and State of Minnesota, have invented certain new and useful Improvements in Tire-Regulator; and I do hereby declare that the following is a full, clear, and exact description thereof, reference being had to the accompanying drawing and to the letters of reference marked thereon.

The nature of my invention consists in the construction and arrangement of a tire-regulator for loosening and tightening tires on carriage-wheels, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
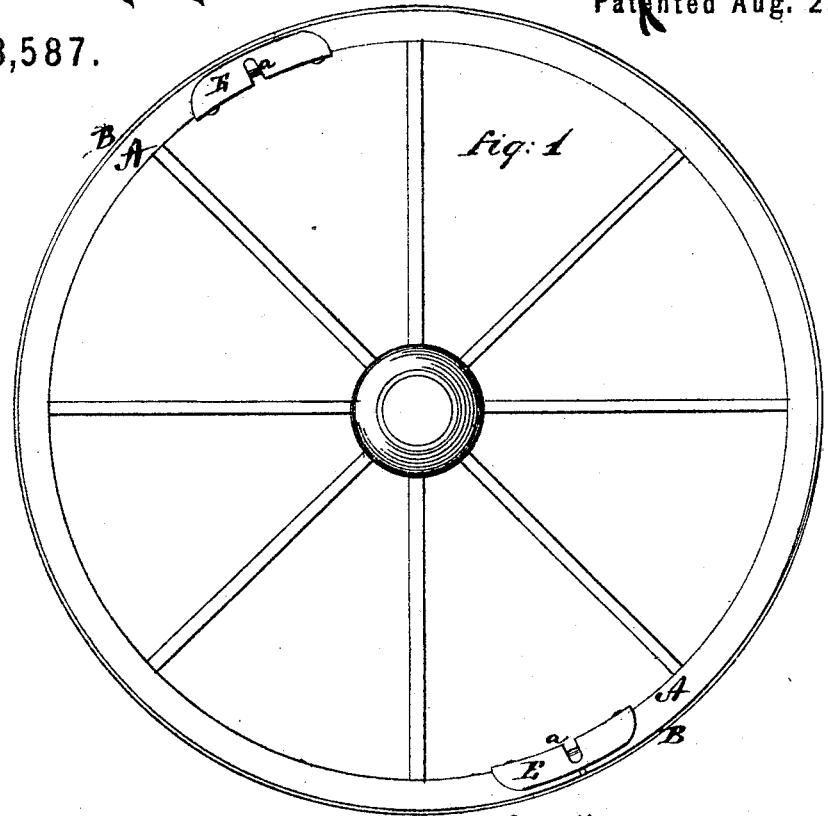
Figure 4:
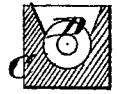
Figure 2:
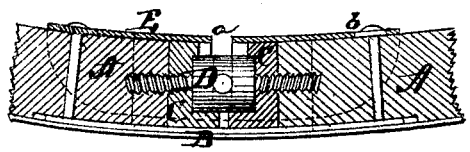
Figure 3:
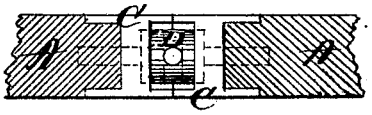

Figure 1 is a side view of the wheel. Fig. 2 is an enlarged longitudinal vertical section of the spreading joint. Fig. 3 is an enlarged horizontal, and Fig. 4 an enlarged transverse vertical section of the same.

A represents the felly, and B the tire of a wheel for vehicles. In all such wheels when the wooden felly shrinks the tire becomes loose, and when the felly swells the tire becomes too tight. To obviate these difficulties and to regulate the tire the felly is cut at two points opposite each other, and in the thus-cut ends are secured flanged nuts C C, as shown in Fig. 3. Through these nuts is passed a spreading-bolt, D, having right-and-left-hand screw-threads, as indicated in Fig. 2. In the center of this bolt is an enlargement, as shown, provided with a hole for the insertion of a rod or lever, by means of which the bolt is turned so as to bring the two parts of the felly closer together or further apart, as may be desired. The joint is entirely covered or inclosed by means of a cap, E, secured at both ends to the felly, but one end allowed to slide by means of a slot, $b$, through which the bolt passes, as shown in Fig. 2. In the center of the cap E is a transverse slot, $a$, so that the rod or lever for turning the bolt D may be inserted without removing the cap. By this means the tire can readily at any time be regulated whenever the felly should swell or shrink.

Having thus fully described my invention, what I claim as new, and desire to secure by Letters Patent, is—

The cap E, provided with longitudinal slot $b$ at one end and the transverse slot $a$ at or near the center, and used in combination with the flanged nuts C C and spreading-bolt D, substantially as and for the purposes herein set forth.

In testimony that I claim the foregoing I have hereunto set my hand and seal this 8th day of May, A. D. 1871.

M. C. CHAMBERLIN. [L. S.]

Witnesses:
P. KIRSCH,
C. L. EVERT.